United States Patent Office.

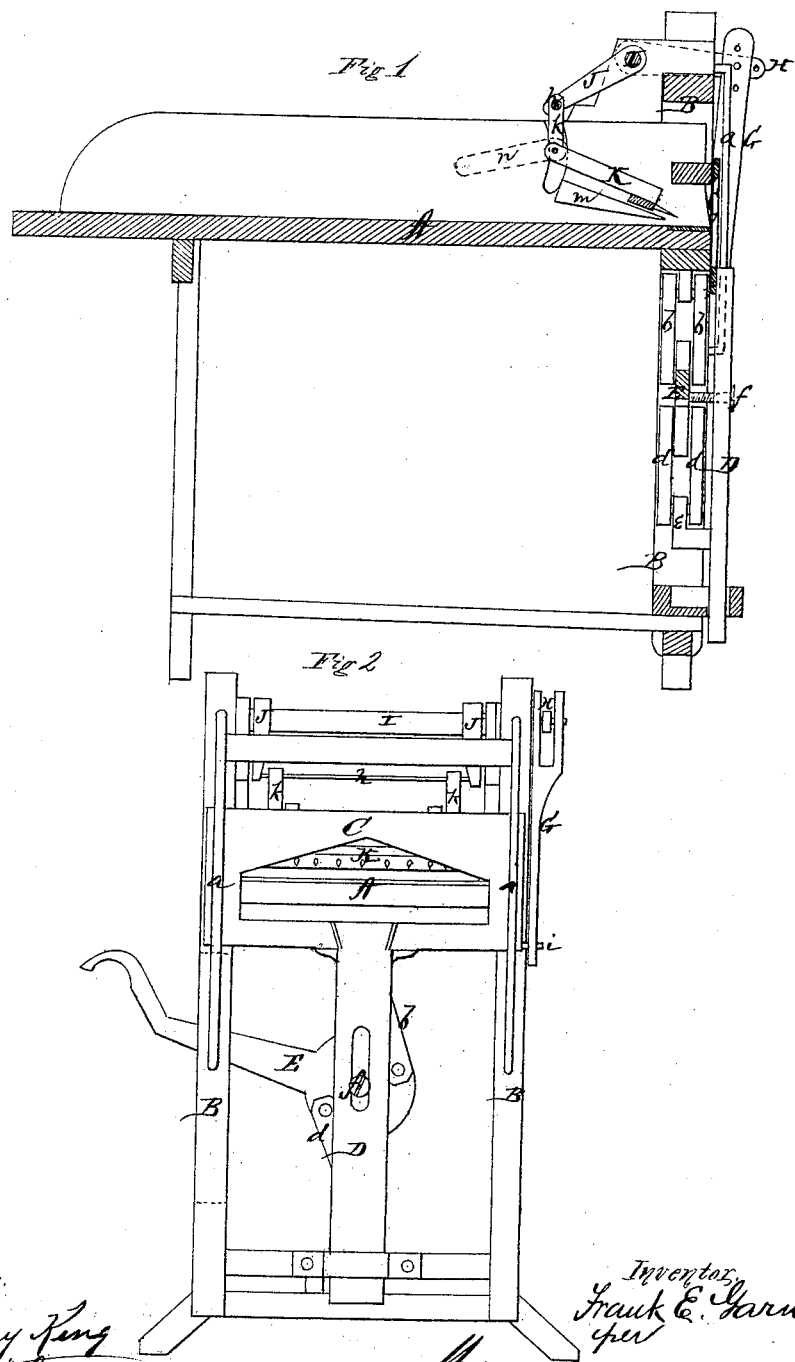

FRANK E. GARNER, OF CORNWALL, CONNECTICUT.

Letters Patent No. 108,249, dated October 11, 1870.

IMPROVEMENT IN FEED-CUTTERS.

The Schedule referred to in these Letters Patent and making part of the same.

*To all whom it may concern:*

Be it known that I, FRANK E. GARNER, of Cornwall, in the county of Litchfield and in the State of Connecticut, have invented certain new and useful Improvements in Feed-Cutter; and do hereby declare that the following is a full, clear, and exact description thereof, reference being had to the accompanying drawing and to the letters of reference marked thereon, making a part of this specification.

The nature of my invention consists in the construction and arrangement of a "feed-cutter," as will be hereinafter fully set forth.

In order to enable others skilled in the art to which my invention appertains to make and use the same, I will now proceed to describe its construction and operation, referring to the annexed drawing, in which—

Figure 1 is a longitudinal vertical section, and

Figure 2, a front elevation of my machine.

A represents the feed-box, supported at a suitable height by a frame, B, at the front end, and by any suitable means at the rear end.

On the front side of the frame B are guides a a, inside of which the knife C moves perpendicularly up and down. This knife is attached to or forms part of a frame which is attached in the center of its lower edge to a bar, D, which passes downward through a mortise or guide formed in the lower part of the frame B.

Under the front end of the box A are pivoted two arms, b b, the lower ends of which are pivoted to the lever E, on the circular or enlarged inner end of the same.

Directly opposite the point where the arms b b are pivoted to said lever, are pivoted the upper ends of two other arms, d d, the lower ends of which are pivoted to a projection or ear, e, on the rear side of the bar D, said arms b b and d d, with the lever E, forming two compound or knuckle-joints, the lever forming a part of each joint.

A screw, f, passing through a vertical slot on the bar D into the lever E forms the movable center around which the knuckle-joints revolve.

For feeding hay it is necessary to get a down and forward movement, and it is necessary for the feeder, in taking position, to be lifted back, for, if the same pressure was on the hay in coming back that is required in feeding, it would draw the hay back. To obviate this difficulty, I have invented a compound feeder, constructed as follows:

On one side, at the lower ledge of the knife-frame, is a pin, i, on which is placed an arm, G, forked at its upper end, and in this fork is pivoted a lever, H, extending from the shaft I, which is placed in suitable journal-boxes above the front end of the feed-box.

From the shaft extend two arms or levers, J J, toward the rear, through the rear ends of which pass a rod, h, and from this rod smaller arms k connect with the feeder K, the front end of which moves upon inclined planes m in the sides of the feed-box.

The rod which connects the arms k k with the feeder extends through curved slots in the sides of the feed-box, and the front ends of levers n are attached to the ends of said rod, the rear ends of said levers being pivoted on the sides of the feed-box, so that when the arms or levers J J raise the rear end of the feeder, the front ends of the levers n will also be raised, and said ends, describing the arc of a circle, will draw the feeder up the inclined planes m m.

Having fully described my invention,

What I claim as new, and desire to secure by Letters Patent, is—

1. The arrangement of the knife C, guides a a, slotted bar D, screw f, and the knuckle-joint b E d, all substantially as shown and described, and for the purposes herein set forth.

2. The combination of the arm G, levers H J, shaft I, rod h, arms k k, levers n n, and inclined planes m m, all constructed and arranged as described, to operate the feeder K, substantially as herein set forth.

In testimony that I claim the foregoing, I have hereunto set my hand and seal this 8th day of July, 1870.

FRANK E. GARNER. [L. S.]

Witnesses:
THEODORE KELLOGG,
PHILO M. KELLOGG.